United States Patent
Payne et al.

(10) Patent No.: US 7,495,856 B2
(45) Date of Patent: Feb. 24, 2009

(54) DISK DRIVE SLIDER DESIGN FOR THERMAL FLY-HEIGHT CONTROL AND BURNISHING-ON-DEMAND

(75) Inventors: Robert N. Payne, San Jose, CA (US); Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 741 days.

(21) Appl. No.: 10/976,630

(22) Filed: Oct. 29, 2004

(65) Prior Publication Data

US 2006/0092570 A1    May 4, 2006

(51) Int. Cl.
G11B 21/02 (2006.01)
G11B 15/64 (2006.01)
G11B 5/127 (2006.01)

(52) U.S. Cl. .................. 360/75; 360/234.4; 360/236.5; 360/128; 29/603.07

(58) Field of Classification Search .................. None
See application file for complete search history.

(56) References Cited

U.S. PATENT DOCUMENTS

| | | | |
|---|---|---|---|
| 4,853,810 A | 8/1989 | Pohl et al. | |
| 5,220,470 A | 6/1993 | Amanth et al. | |
| 5,734,519 A | 3/1998 | Fontana et al. | |
| 5,959,801 A | 9/1999 | Gillis et al. | |
| 5,991,113 A | 11/1999 | Meyer et al. | |
| 5,991,119 A | 11/1999 | Boutaghou et al. | |
| 6,233,118 B1 | 5/2001 | Boutaghou et al. | |
| 6,307,719 B1 | 10/2001 | Mallary | |
| 6,707,631 B1 | 3/2004 | Haddock | |
| 6,707,646 B2 | 3/2004 | Berger et al. | |
| 6,757,125 B2 | 6/2004 | Vettiger et al. | |
| 7,203,035 B2 * | 4/2007 | Koide et al. ............... 360/294.7 |
| 2002/0034035 A1 | 3/2002 | Vettiger et al. | |

(Continued)

FOREIGN PATENT DOCUMENTS

EP    0242597 A2    10/1987

(Continued)

OTHER PUBLICATIONS

IBM, "Magnetic Head with Piezoelectric Positioning", IBM Technical Disclosure Bulletin, Oct. 1973, p. 1429.

(Continued)

Primary Examiner—Andrew L. Sniezek
(74) Attorney, Agent, or Firm—G. Martin Knight

(57) ABSTRACT

An embodiment of the invention is a slider with a lift pad and a thermal protrusion pad in which the heads are located. The lift pad is located immediately in front of the thermal protrusion pad and is designed to achieve the flying characteristics needed for normal operation of the disk drive. The thermal protrusion pad includes a heater which is used to protrude the pad for burnishing-on-demand and/or for thermal fly-height control. The thermal protrusion pad is designed to generate very little lift so that protruding the thermal protrusion pad does not significantly increase the lift experienced by the slider. An alternative embodiment uses two overcoat thicknesses on the ABS surface with the thermal protrusion pad having a thin overcoat and the lift pad having a thicker overcoat.

13 Claims, 11 Drawing Sheets

U.S. PATENT DOCUMENTS

| | | |
|---|---|---|
| 2002/0057511 A1 | 5/2002 | Kikitsu et al. |
| 2002/0067574 A1 | 6/2002 | Gillis et al. |
| 2002/0126416 A1 | 9/2002 | Smith |
| 2002/0176208 A1* | 11/2002 | Serpe et al. ............... 360/235.7 |
| 2002/0191326 A1 | 12/2002 | Xu et al. |
| 2002/0197936 A1 | 12/2002 | Smith |
| 2003/0035237 A1 | 2/2003 | Lille |
| 2003/0048559 A1 | 3/2003 | Jove et al. |
| 2003/0053253 A1 | 3/2003 | Mundt et al. |
| 2003/0128471 A1 | 7/2003 | Bolasna et al. |
| 2003/0133227 A1* | 7/2003 | Anan et al. ............... 360/236.3 |
| 2003/0174430 A1 | 9/2003 | Takahasi et al. |
| 2003/0184915 A1 | 10/2003 | Kameyama et al. |
| 2003/0184916 A1 | 10/2003 | Hanchi et al. |
| 2004/0016107 A1 | 1/2004 | Alexopoulos et al. |
| 2004/0021980 A1 | 2/2004 | Albrecht et al. |
| 2004/0027728 A1 | 2/2004 | Coffey et al. |
| 2004/0029488 A1 | 2/2004 | Smith |
| 2006/0023354 A1* | 2/2006 | Stipe ......................... 360/128 |

FOREIGN PATENT DOCUMENTS

| | | |
|---|---|---|
| JP | 1216769 A1 | 8/1989 |
| JP | 8287444 A1 | 11/1996 |
| JP | 8329439 A1 | 12/1996 |
| JP | 9293221 A1 | 11/1997 |
| JP | 2002230930 A1 | 8/2002 |

OTHER PUBLICATIONS

IBM, "Partial Overcoat of a Magnetic Recording Head Air Bearing Surface", IBM Technical Disclosure Bulletin, Jul. 1995, p. 241.

B. Strom, et al., "Burnishing Heads In-Drive for Higher Density Recording", IEEE Transactions on Magnetics, vol. 40, No. 1, Jan. 2004, p. 345.

* cited by examiner

DISK DRIVE SLIDER DESIGN FOR THERMAL FLY-HEIGHT CONTROL AND BURNISHING-ON-DEMAND

RELATED APPLICATION

A co-pending, commonly assigned application bearing Ser. No. 10/673,593 describing a hermetically sealed HDD enclosure which can be used in one of the embodiments of the present invention was filed on Sep. 29, 2003. The Ser. No. 10/673,593 application is hereby incorporated herein by reference. A co-pending, commonly assigned application bearing Ser. No. 10/909,128 filed on Jul. 30, 2004 describes a disk drive with a slider which implements burnishing-on-demand. The Ser. No. 10/909,128 application is hereby incorporated herein by reference.

FIELD OF THE INVENTION

The invention relates to sliders used in disk drives and more particularly to methods and means for thermally adjusting the slider fly-height and burnishing the slider in situ in a disk drive and to design of air-bearing features on the slider.

BACKGROUND OF THE INVENTION

Selected components of a prior art magnetic disk drive 10 are illustrated in FIG. 1. A slider 13 containing magnetic transducers (heads) 12 for reading and writing magnetic transitions is urged toward the rotating disk 16 by a suspension (not shown). As the disk rotates an air-bearing develops under the slider and causes it to fly. The slider has an overcoat 15 which provides corrosion protection for the metals in the magnetic transducers 12. The disk 16 typically includes a thin film overcoat 17 and a set of thin films 18 which include one or more ferromagnetic layers in which information is recorded. The average vertical distance between the overcoat over the magnetic read sensor and the disk surface is typically called the element fly-height (FH). Slider clearance is used to mean the amount of fly-height drop allowed before head-disk contact occurs between the lower points of the slider surface and the asperities of the disk. The magnetic spacing between the read and write elements and the disk ferromagnetic material includes two overcoats 15, 17 and the fly-height. A disk drive can contain multiple disks and multiple sliders. The slider 13 contains heater 14 which is used to affect the fly-height of the slider by causing a local thermal expansion of the slider in the area where the read and write heads are located. The thermal expansion has the effect of pushing the transducers closer to the disk and reducing the spacing between the ferromagnetic recording material in the disk and the active components in the slider. A lower slider fly-height and lower magnetic spacing is required for higher areal densities. Fly-heights of less than 7 nm are currently needed. Also the overcoats are made as thin as possible to reduce magnetic spacing. Each slider heater has an adjustable power control element (not shown) in series with it. The thermal expansion induced by a heater can be used in several ways. One use is to compensate during read operations for the similar effect which occurs during a write operation. The electrical current in the write coil causes a thermal protrusion with pushes the write head closer to the media.

Since the dimensions of magnetic sensors are currently on a nanometer scale, the surface topography has become more significant. In one phase of processing the air-bearing surface (ABS) of the slider is typically lapped to a highly smooth surface by mechanical standards, but the resulting surface is nevertheless somewhat irregular on a nanometer scale as is suggested in FIG. 1. In addition to the roughness, the materials in the transducers 12 are typically much softer than the surrounding slider body 19 and tend to be recessed from the general plane of the ABS after slider fabrication. This recession contributes to the spacing between the magnetic sensor in the transducer and the magnetic material in the disk and is, therefore, undesirable. The slider also flies at a slight pitch angle, for example, 100 micro-radians, may have a slight roll, and the ABS may not be perfectly flat so the lowest point on the slider may not be near the transducers.

In US patent application 2003/0174430 by Takahasi, et al., a disk drive with heaters in the slider is described. The heaters include a heating coil and a thermal expansion element. Two heaters are disposed on opposite sides of the transducers (heads). A temperature sensor near the heads is included. The heating coils are electrically connected through the wirings disposed in the arm assembly to a power source and the control unit. Current is supplied from the power source to the coils under control of the control unit. The control unit has a fly-height detection unit, a fly-height control unit, a power supplying control unit, and a converting unit.

US patent application 20040021980 by Albrecht, et al., describes a disk drive with a self-limiting wear contact type air-bearing slider. The magnetic elements of the read/write head extend into and are surrounded by a wearable pad that protrudes beyond the air-bearing surface of the slider. The end of the protruding pad and the ends of the magnetic elements are covered by a corrosion-resistant overcoat that protects the magnetic elements during slider fabrication and disk drive assembly. The overcoated protrusion pad sliders are assembled into the disk drive in a special environment, typically air with humidity controlled below a level above which corrosion of the magnetic elements would occur. The drive is then hermetically sealed. When the slider and disk are first engaged, the disk will be rotated at a reduced RPM (or reduced atmospheric pressure) so that the pad will interfere with the disk surface, which is typically formed of amorphous carbon, and wear down to a selected level. When this level is reached, the wear will be self-limiting and not continue further because of the support provided by the ABS at the reduced disk RPM. When the wear point is reached the overcoat will be completely removed from the pad, thereby exposing the magnetic elements. This initial wear-in process takes place fairly rapidly, typically within about thirty minutes. When the disk is then rotated at full RPM during normal operation of the disk drive there will be a small, well-defined clearance between the magnetic elements and the disk. The result is a head/disk interface which is near contact or zero interference to provide a very small magnetic spacing and which can be reproduced with a wide range of manufacturing tolerances.

US patent application 20040029488 by Gordon Smith describes a method of burnishing a rear pad of a slider within a disk drive. The rear pad is formed of a burnishable material and contains the transducers for reading and writing. The slider is moved in a radial fashion relative to the disk surface in a reciprocal fashion, causing the rear pad to rock. As the rear pad rocks, contact between the rear pad and the disk surface burnishes the rear pad. As a result, a positive camber is imparted in the rear pad relative to the magnetic sensor element. The method can be practiced following initial manufacture of the disk drive, or at various times over the life of the disk drive. In one embodiment, the method includes establishing a radial acceleration of the slider in the first burnishing mode of operation as greater than a radial acceleration of the slider under normal operational conditions of the disk drive. In another embodiment, the disk rotational speed is varied to further enhance burnishing.

In US patent application 20030184916 by Hanchi, et al., the contact interface of the slider is textured to provide a relatively high wear rate to form a self-adjusting fly height interface. Head-disk contact between the textured slider area burnishes the surface of the slider. The burnished portion provides a profile to transition from a contact regime to a fly height regime. Typically, the slider body is formed of an $Al_2O_3$—TiC material and the transducer portion includes an $Al_2O_3$ (alumina) transducer portion encapsulating the transducer elements. The textured structure is formed on the relative soft $Al_2O_3$ portion using interference lithography techniques or laser holography to provide a desired wear rate and a self-adjusting fly height transition.

In US patent application 20020126416 by Gordon Smith a combined magnetic data and burnish head for magnetic recording is described. A burnishing operation is initiated using magnetic force means in the suspension to force the slider below a normal fly-height. The rotational speed of the disk can be substantially less than the rotational speed of the disk during normal read/write operation. In one embodiment, the disk is rotated between about 2500 rpm and about 5000 rpm during the burnishing operation and at about 10,000 rpm during the normal read/write operation. During burnishing operation, the burnishing element physically contacts and removes contaminant particles and/or or other disk surface irregularities.

In the conventional process for fabricating sliders thin film structures for a plurality of heads are fabricated on a wafer. The individual sliders are cut from the wafer and the cut surfaces containing the heads is further processed to become the ABS. The structures on the ABS are critical in determining the flying characteristics of the slider. The range of conditions under which sliders must perform properly include the different surface velocity of the disk at the inner diameter (ID) versus the outer diameter (OD) and the skew introduced by the arcuate path of the actuator which positions the slider over the disk. The ideal features on the ABS are, therefore, not symmetrical. The cut surface of the slider includes a large area of the substrate material which is typically a composite ceramic Al2O3/TiC of an N58 wafer. The features related to the flying characteristic (sometimes called "rails") are formed by etching the substrate material adjacent to the heads. Two levels of etching are currently used. A dual level etching process is described in US patent application 20030128471 by Bolasna, et al. A dual etch depth slider air bearing surface is described that includes a front pad, a rear pad, and a skewed center rail connecting the front pad to the rear pad. Extending above the rear pad is a V-shaped ABS pad and extending above the front pad are two leading edge ABS pads that are separated by a channel towards the longitudinal center of the slider. The design is said to enable the slider to fly much higher over the landing zone of the disk than at the data zone and provides for a steep take off profile followed by a rapid descend over the data zone.

SUMMARY OF THE INVENTION

An embodiment of the invention is a slider with a lift pad and a thermal protrusion pad in which the heads are located. The lift pad is located immediately in front of the thermal protrusion pad and is designed to achieve the flying characteristics needed for normal operation of the disk drive. The thermal protrusion pad includes a heater which is used to force the thermal protrusion pad to protrude. The slider according to the invention can be used in disk drive using thermal fly-height control and/or burnishing-on-demand. The thermal protrusion pad is designed to generate very little lift so that protruding the thermal protrusion pad does not significantly increase the lift experience by the slider. The lift that would otherwise be generated by the protruding thermal protrusion pad is minimized using a steep wall on the front of the pad. Preferably this is done by etching a relatively deep trench to separate the lift pad and the thermal protrusion pad. Minimizing lift from the thermal protrusion pad minimizes the compensation for fly-height change due to protrusion and decreases the heater power necessary for controlling the head fly-height or for burnishing.

An alternative embodiment uses two overcoat thicknesses on the ABS surface with the thermal protrusion pad having a thin overcoat and the lift pad in front of the thermal protrusion pad having a thicker overcoat. The use of a thicker overcoat on the lift pad compensates for the change in fly-height between these two pads due to the pitch of the slider and effectively lowers the fly-height of the lift pad without bringing the thermal protrusion pad into contact with the disk prematurely.

In one alternative embodiment, a slider according to the invention is used in a disk drive having a capability of adjusting the fly-height of the thermal protrusion pad. In this embodiment each slider includes a heating element with sufficient thermal expansion stroke to compensate for the increase in fly-height when the write head is turned off during read back. Alternatively, the heating element can be used to adjust the fly-height to compensate for the effects of fly-height sigma, drive temperature, drive pressure, or slider radial disk position.

In another alternative embodiment, a slider according to the invention is used in a disk drive having a capability of burnishing the sliders on demand. Each slider includes a heating element with a sufficient thermal expansion stroke to bring the area of the slider containing the transducer into contact with the disk surface to burnish the slider. Since the disk drive controls the power applied to the heater, the time of burnishing can be selected. Also, the amount of power may be selected to control the contact pressure during burnishing. Preferably the heater is used to bring the slider into contact with the disk to burnish the thermal protrusion pad, which is the lowest flying part of the slider body, after the drive has been assembled. Optionally most or all of the overcoat and recession can be removed to expose the transducers at the ABS. The burnish process is optionally performed in situ in the drive. The drive is optionally sealed hermetically to reduce the risk of corrosion after burnishing. The slider can be flown and magnetically tested prior to burnishing off the overcoat to avoid corroding the head before the drive is assembled. Using a heater to protrude the head allows burnishing without changing disk rpm or ambient pressure. Burnish times can be minimized and burnish control improved because only the very small area of the thermal protrusion pad (the area that protrudes) comes into contact with the disk. The burnishing-on-demand of the invention can reduce magnetic spacing compared to the prior art and/or reduce the heater power and magnetic sensor temperature while the heater is on. Advantageous tradeoffs between magnetic spacing and the power/temperature budget of the heater can be made using the invention. The distribution of fly-height clearance (sigma) is reduced because a fixed power/protrusion can be used to burnish which leads to a variable amount of burnish depending on the original fly height of the heads. This variable burnishing compensates for the original variations in fly height from slider to slider by removing a variable amount of material from the slider.

DETAILED DESCRIPTION OF THE INVENTION AND THE PREFERRED EMBODIMENTS

The Burnish-on-Demand Slider and Disk Drive

Figure 1:
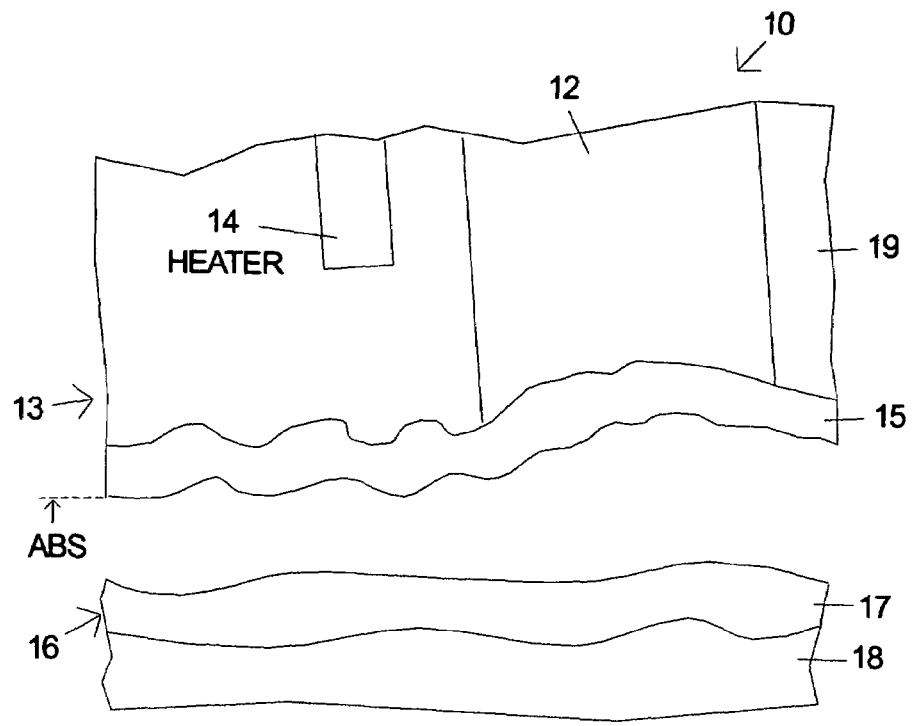
FIG. 1 is an illustration of selected components of a prior art disk drive illustrating the relationships between the slider, the heater and the disk.
Figure 2:
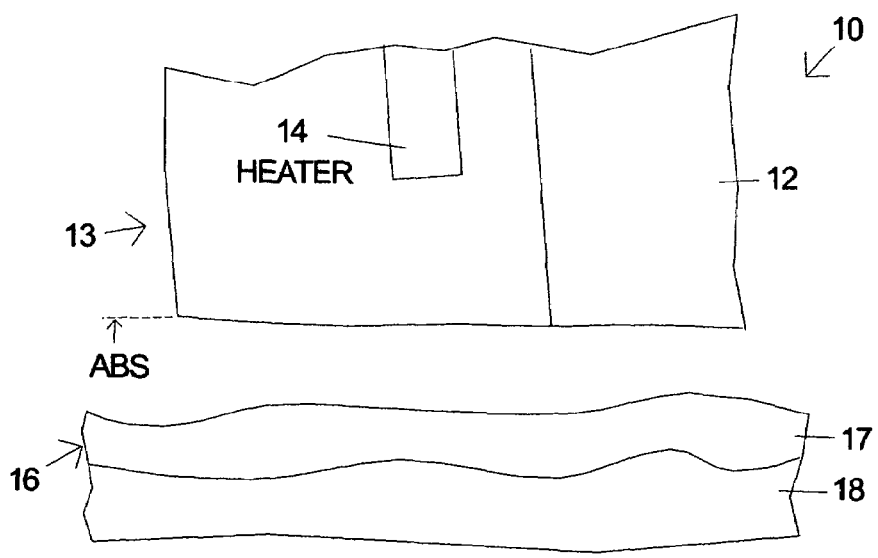
FIG. 2 is an illustration of a disk drive with according to an embodiment of the invention after burnishing.

The ABS structure according to the invention can be used with a variety of head designs and therefore, can be used with longitudinal or perpendicular heads. A disk drive according to the invention optionally includes a control system which executes a burnishing operation under firmware control. A disk drive typically includes one or more sliders. A slider according to the invention includes a heat source near the read sensor which has the capacity to protrude the surface of the slider by an amount sufficient to cause contact with the disk while the disk is rotating. Unlike some other burnishing methods, the invention does not require reduced rpm and can achieve burnishing at the normal rotation speed. The heater can be a separate element 14 in the slider as shown in FIG. 2, but it is also possible to use the write coil for the heating. In the following the term heater will be used to refer interchangeably to either a separate heater or the write coil used as a heater.

FIG. 2 illustrates a disk drive 10 according to the invention after the burnishing has been performed. The slider 13 has been burnished against the disk 16 by supplying sufficient power to heater 14 to cause a thermal protrusion of the slider. The burnishing has been continued long enough to remove all of the overcoat and the recession have been removed. The resulting ABS is smoother and more parallel to the disk surface than prior to burnishing. Although the burnishing process of the invention can be performed when conventional hard materials are used such as diamond-like-carbon (DLC) for the overcoat and $Al_2O_3$—TiC or other ceramic for the slider body, softer materials or structures can be used as well.

Figure 12:
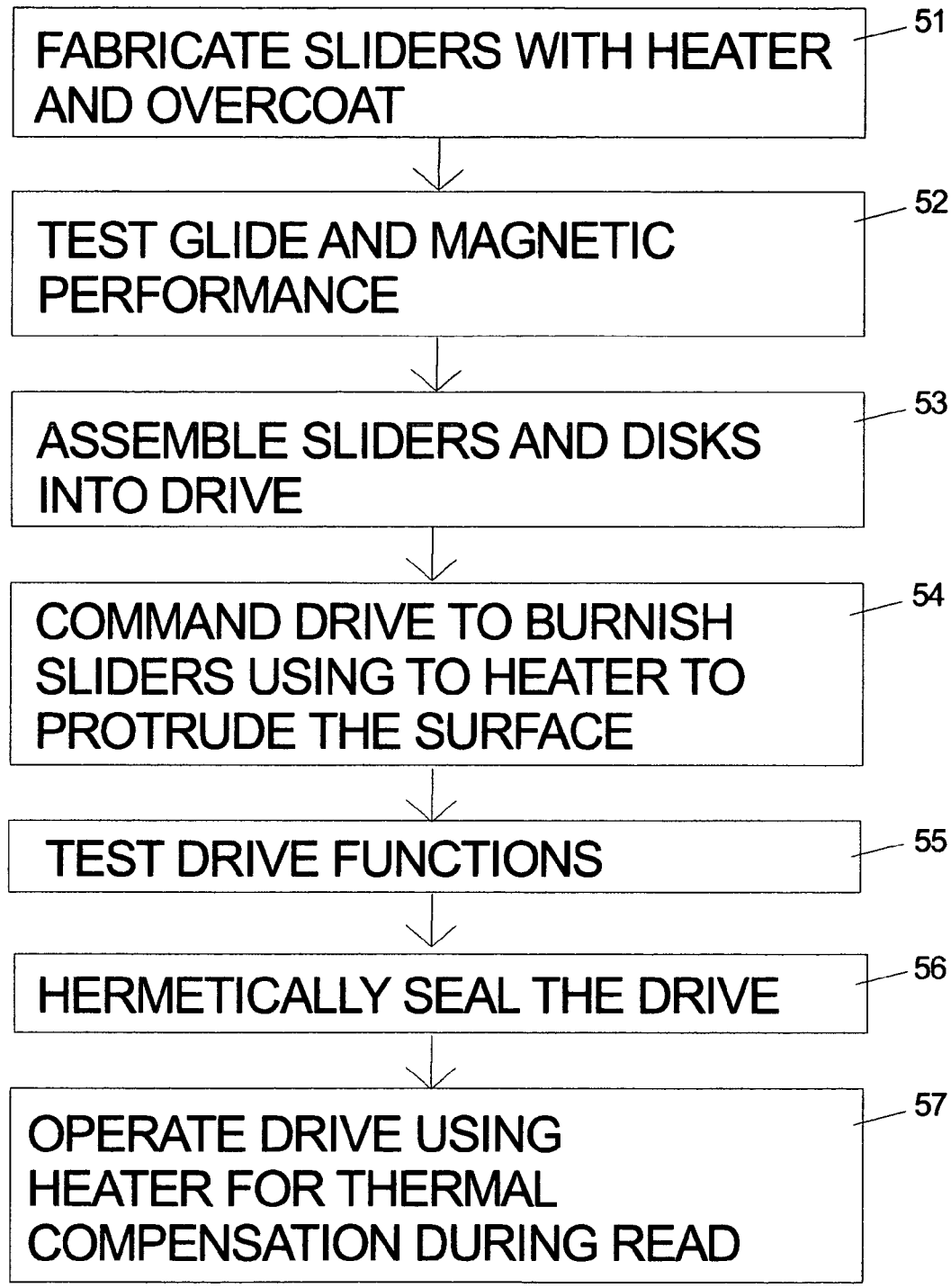
FIG. 12 is a flow chart of a method of manufacturing disk drives according to the invention.

FIG. 12 is a flow chart of a method of manufacturing disk drives according to the invention. The sliders are fabricated with a heater and preferably with a protective overcoat as in the prior art 51. The conventional glide and magnetic testing is optionally performed as in the prior art 52. The sliders and disk are installed into the disk drive 53. The burnishing process is executed by the drive control system using a selected power level to the heater 54. Drive-level testing is conducted 55. The disk drive is preferably hermetically sealed 56 after the burnishing and subsequent testing since the cost of sealing is relatively high and can be saved if the disk drive is already malfunctioning. The process can be initiated by prior art means used to initiate disk drive activity under control of the firmware, for example, by command from host computer. The normal operation of the disk drive for further testing and use is preferably performed using the heater for thermal protrusion compensation during read operations 57. Assuming the same environmental conditions, the power level for normal operation will preferably be less than the burnishing power level. To provide slider clearance during normal operation the protrusion during burnishing is larger than the protrusion during normal operation.

Optionally, the burnishing process is executed on a test disk before installation into the disk drive (not shown in FIG. 12). This has the advantage that a slightly rougher disk may be used to speed the burnishing process rather than to use the typically very smooth disk used in today's hard drives. However, this has the disadvantage that corrosion may occur before installation and there may be slight changes in nominal fly-height after installation.

Figure 3:
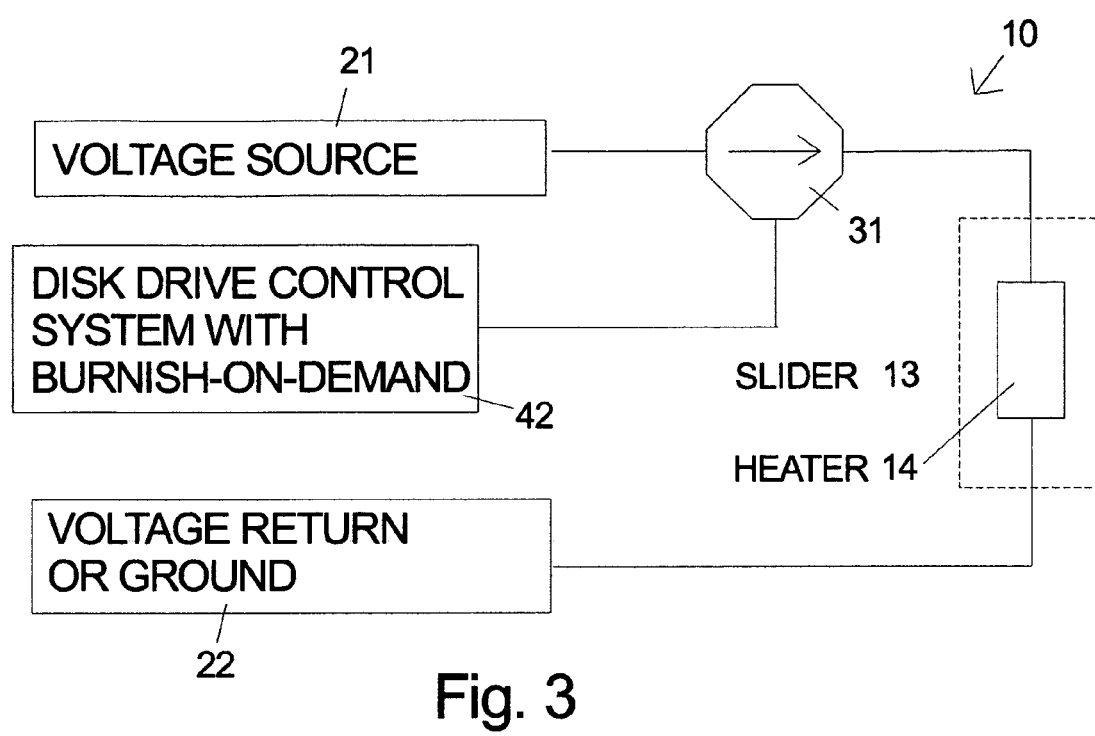
FIG. 3 is an illustration of a disk drive with according to an embodiment of the invention with burnishing controlled by the disk drive control system.

In FIG. 3 disk drive 10 includes disk drive control system 42 which includes microprocessors and firmware (not shown). The drive control system 42 controls the amount of power to heater 14 by signaling programmable power control element 31 which can be a voltage or current control device. The voltage source 21 can be the conventional power supply voltage in disk drives. The circuit through the heater 14 is completed through the voltage return (for example, a negative voltage) or ground 22. Prior art drive control systems execute many control functions automatically, but also include means for accepting commands from a host computer including commands related to testing, calibration and power management. The burnish-on-demand of the invention is preferably integrated into the overall drive control system, so that a command from the host computer or test station can invoke the burnishing process.

Figure 4:
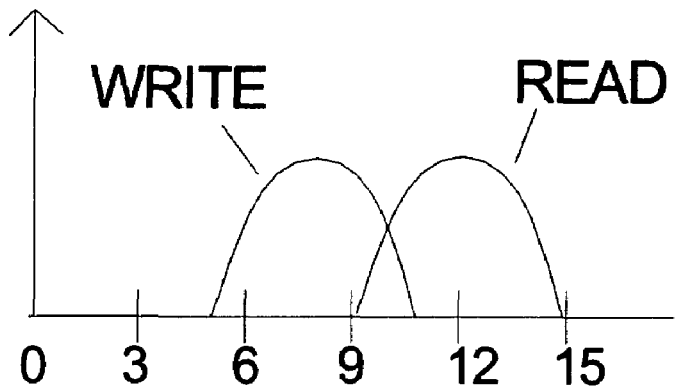
FIG. 4 is a graph of magnetic sensor clearance distributions for a typical set of prior art sliders subject to write protrusion effects without compensation according to a first example.

To illustrate the advantages of the invention graphs comparing magnetic sensor clearance for various heads will be described. Sensor clearance refers to the drop in magnetic spacing required to bring the lowest part of the active sensor material into contact with the disk asperities. FIG. 4 is a graph of magnetic sensor clearance distributions for a typical set of prior art sliders subject to write protrusion effects without compensation. In FIG. 3, it is assumed that the combined head carbon thickness and magnetic sensor recession is 3 nm, the minimum slider clearance for long-term reliability is 2 nm, the fly-height three-sigma is 3 nm, and the write protrusion is 4 nm. The sigma is assumed to include the effects of slider, suspension, and other variations. Fluctuating environmental conditions such as temperature, pressure, and the slider disk-radius position are assumed fixed for illustration. For the conventional slider, the maximum magnetic sensor clearance above the disk is therefore 15 nm. The write protrusion has the effect of pushing the magnetic sensor 4 nm closer to the disk when the write coil is heating the slider.

Figure 5:
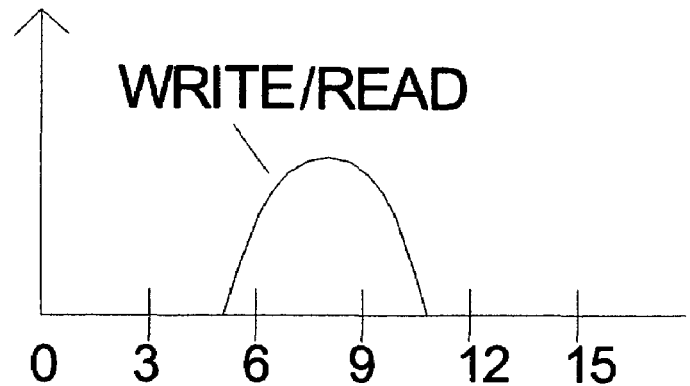
FIG. 5 is a graph of magnetic sensor clearance distributions for a typical set of prior art sliders subject to write protrusion effects with compensation according to a first example.

In the FIG. 5 a population of sliders is considered with thermal protrusion compensation (TPC). In these drives, a heater is used to compensate for write protrusion which results in the read and write population distributions coinciding. The heater in this case is used to protrude the slider 4 nm during a read operation. This brings the worst case magnetic sensor clearance to 11 nm.

In disk drive according to the invention, the heater is designed to have a greater capacity to protrude the slider, that is, has a longer stroke, than is produced by the write head during a normal write operation. The lowest flying slider in the population is designed to just clear the disk with the heater off. The heater is designed to protrude the head by a selected amount, for example, 6 nm, which will bring the entire population of sliders into contact with the disk. Burnishing is accomplished under the control of the firmware in the disk drive control system by supplying power to the heater to protrude the head by the selected amount while rotating the disk. The length of time required for burnishing to the desired level can be determined empirically depending on the specifics of the design, materials, etc. The length of time may be selected to be long enough that the wear rate drops to a very low value. In this case the total amount of wear is self-limiting as the slider begins to fly and just clears the disk. The specific parameters for the burnishing process can be established by experiment and then applied to all disk drives without the need to adjust the parameters for each slider. The burnishing according to the invention provides an inherent self-adjustment to some extent for each slider and disk combination. Since the slider is burnished to just clear the irregularities of the disk surface, each slider and disk combination is more closely matched than is the case when randomly varying parts are combined without in situ burnishing. The distribution of fly-height clearance (sigma) is reduced because a fixed parameters (heater power, duration, rotation rate, etc.) can be used to burnish which leads to a variable amount of material being burnished off as a result of the variations in the sliders and disk. This variable burnishing compensates for the original variations in fly height from slider to slider by removing a variable amount of material from the slider. The result is reduced variations in the slider and disk interface, lower sigma of clearance and improved magnetic performance.

Figure 6:
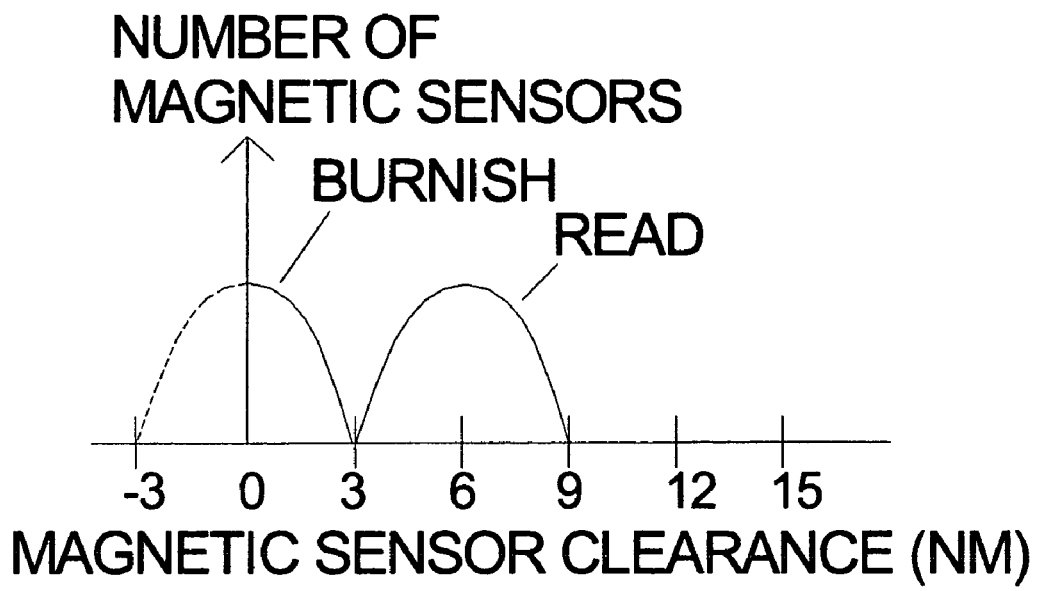
FIG. 6 is a graph of magnetic sensor clearance distributions for a set of sliders according to a first embodiment of the invention after burnishing with the heater on at the burnish power level.
Figure 7:
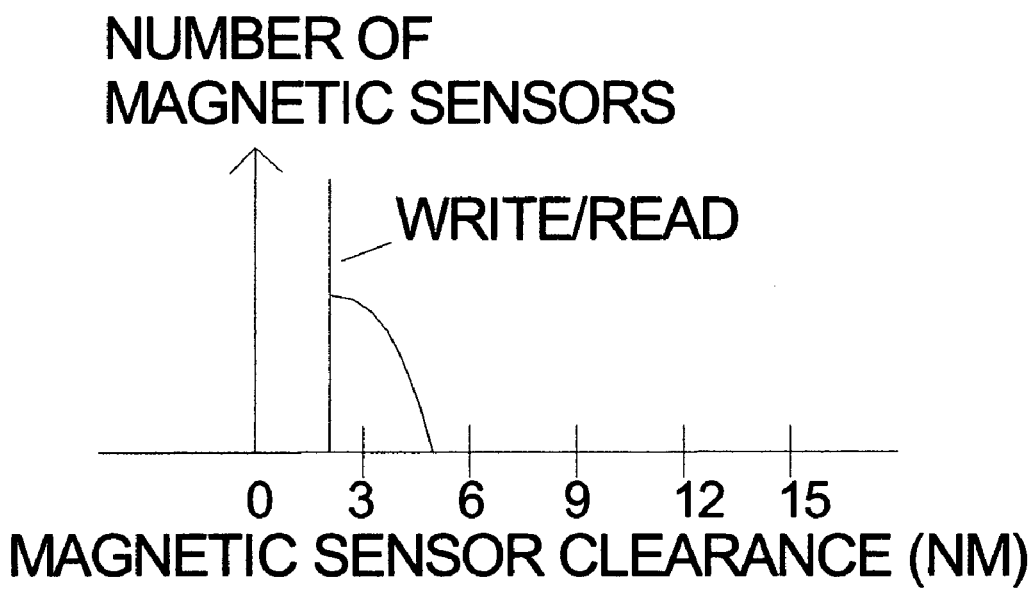
FIG. 7 is a graph of magnetic sensor clearance distributions for a set of sliders according to a second embodiment of the invention after burnishing with the heater on at the write compensation power level.
Figure 8:
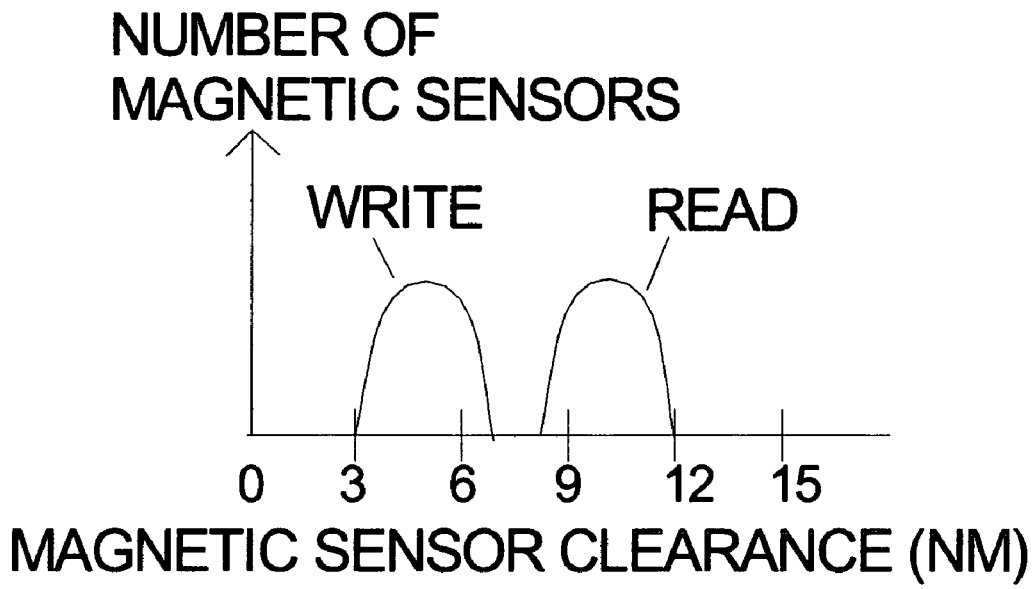
FIG. 8 is a graph of magnetic sensor clearance distributions for a typical set of prior art sliders subject to write protrusion effects without compensation according to a second example.
Figure 9:
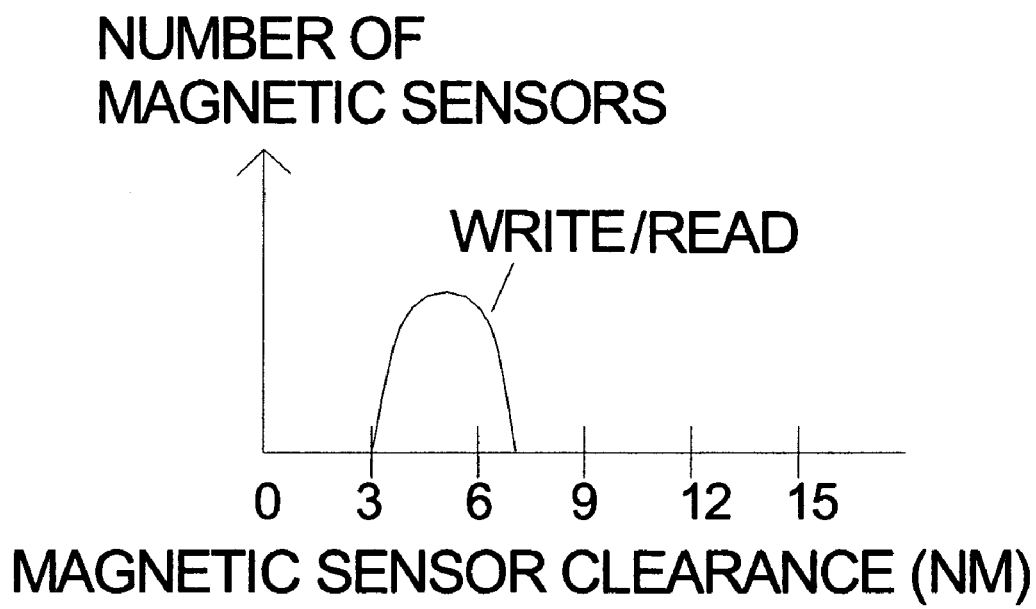
FIG. 9 is a graph of magnetic sensor clearance distributions for a typical set of prior art sliders subject to write protrusion effects with compensation according to a second example.
Figure 10:
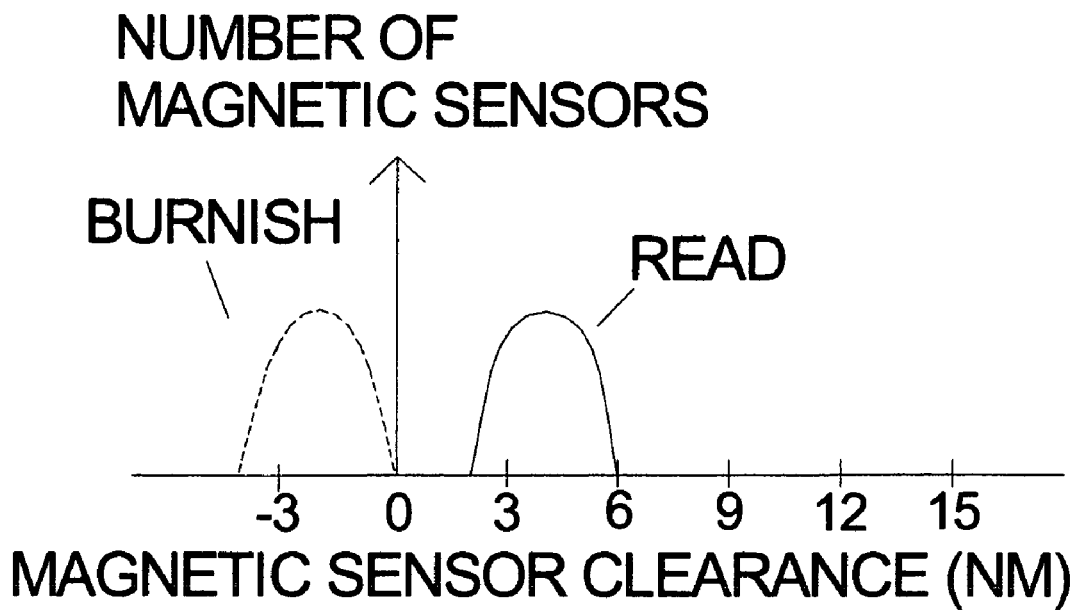
FIG. 10 is a graph of magnetic sensor clearance distributions for a set of sliders according to a second embodiment of the invention after burnishing with the heater on at the burnish power level.

In the example shown in FIG. 6, the burnishing power, rotation rate and time are selected so that statistically half of the heads are burnished all the way to the magnetic sensor. When burnishing is initiated the sliders are driven to contact the disk surface over a certain range of topography. This is illustrated by the dotted line on the graph extending from the 0 clearance to −3 nm clearance points. As material is worn away the sliders are still in contact with the disk for a certain range of topography. The duration of the burnishing for a population of sliders in this example is continued until statistically, half of the sliders have a thinned overcoat, for example, 0-2 nm of carbon remaining while half would have no overcoat left. FIG. 7 shows the graph of magnetic sensor clearance for the burnished sliders according to this example during normal use. The sliders include TPC, therefore, the read and write operations have approximately equal thermal protrusions of 4 nm. The burnishing has on average removed the 2 nm of the overcoat and the 1 nm of recession. The magnetic sensor clearance for the upper half the population has shifted downward by 4 nm and the lower half of the population are grouped at 2 nm.

Figure 11:
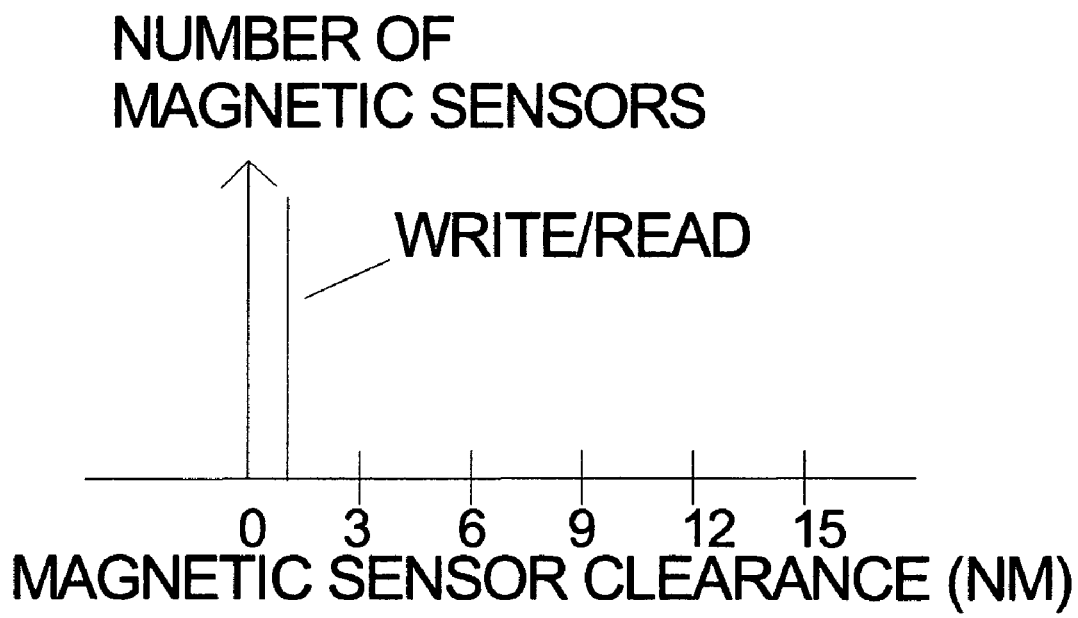
FIG. 11 is a graph of magnetic sensor clearance distributions for a set of sliders according to a second embodiment of the invention after burnishing with the heater on at the write compensation power level.

The maximum magnetic sensor clearance is now only 5 nm compared to 15 nm for the conventional slider of FIG. 4 and 11 nm for the TPC slider of FIG. 5. The maximum heater power during normal read operations is limited due to the signal degradation that occurs when the magnetic sensor temperature increases, but for burnishing read operations are not needed, so higher power is feasible.

In FIGS. 8-11, a second example of an embodiment of the invention is illustrated. In this design the carbon overcoat plus magnetic sensor recession is 2 nm, the minimum reliable slider clearance is 1 nm, the three-sigma fly-height is 2 nm, and the normal writer and heater stroke is 5 nm. The higher power heater stroke is again 6 nm. In this case, the conventional slider in FIG. 8, the TPC slider in FIG. 9, and completed burnish-on-demand slider FIG. 11 have a maximum magnetic sensor clearance of 12 nm, 7 nm and 1 nm respectively. The burnishing process is continued in this example to statistically result in the overcoat and recession being completely removed from the population of sliders. Notice that the sharp distribution at 1 nm clearance is due to the variable degree of burnish with initially high flying sliders burnished less than the initially low flying sliders. This is advantageous because fly-height sigma is reduced without having to increase heater power for the high-flying sliders. This in turn reduces the maximum head temperature and reduces the power budget of the heater. Also, fluctuating environmental conditions such as temperature, pressure, altitude, or slider disk-radius position can be compensated by adjusting the heater power. Hermetic sealing eliminates altitude sensitivity so in this case a pressure sensor is not needed. A drive temperature sensor can be used and the effect of pressure or "static protrusion" variations due to HDD operating temperature compensated with the heater (with a slightly increased power budget). Of course the sharp distribution shown in FIG. 11 for illustration purposes will not be perfectly sharp due to small variations in the burnishing process. It should also be noted that static protrusion, pressure, and slider radial position can affect slider pitch, roll, and ABS shape so that the sensor is not at the lowest point on the ABS surface. However these effects are small and can be reduced by shrinking the size of the burnish pad containing the sensor and by optimizing the environmental conditions used during burnishing. Therefore, the combination of burnish-on-demand slider and hermetic sealing can be used to achieve a low-flying slider design with a very small and precise magnetic sensor to disk clearance which is precisely set through burnishing during manufacture and dynamically adjusted during use as the temperature and slider radial position over the disk changes. By reducing magnetic spacing, the burnish-on-demand concept can be used for ultra-high areal density recording at up to 1 Terabit-per-square-inch and beyond.

The specific level of power that will be required to achieve burnishing is affected by a variety of conditions existing at the time including ambient temperature and pressure. The operating conditions for the drive can be significantly more extreme, so the amount of power required for the heater in the field during readback could conceivably be greater than was needed for burnishing in the well-controlled manufacturing environment. If the heater is used for temperature compensation, pressure compensation, slider linear velocity (disk radius) compensation, etc., these adjustments could require greater power than the power used to burnish. However, given a set of environmental conditions at the time of burnishing, the protrusion during burnish is larger than the protrusion caused by the write coils. This is to insure that enough slider material is burnished so that head disk contact does not occur when the writer is used.

In a particular embodiment of the present invention, the disk drive is hermetically sealed in a low-humidity, low-density gas environment after the burnishing is executed. Low humidity prevents corrosion of the exposed sensor material while optional low density gas improves the HDD mechanical performance. A hermetically sealed enclosure includes a metal housing with a thin metal cover and a multi-pin feed-through for passing signals to and from the mechanism sealed therein. After the HDD components are placed into the metal housing, a low-density gas, such as helium, hydrogen, methane or sub-ambient pressure air, is hermetically sealed in the metal housing.

The Slider with a Thermal Protrusion Pad and a Lift Pad

Figure 14:
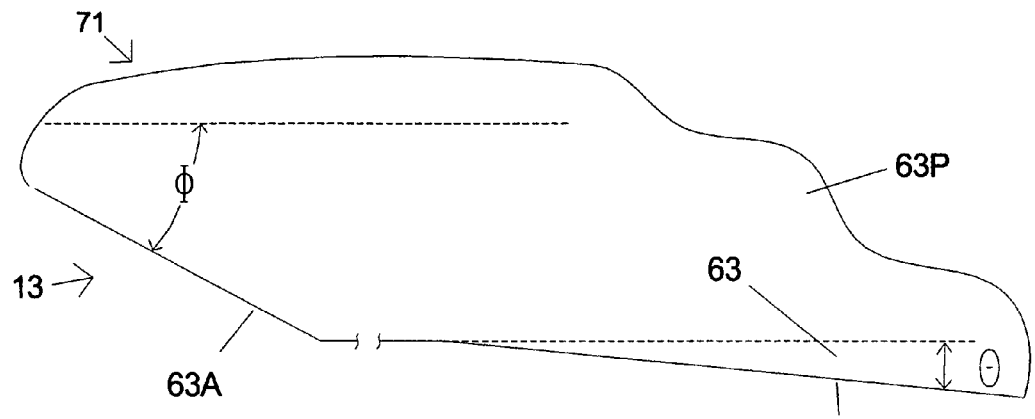
FIG. 14 is an enlarged view of a midline section of a lift pad according to an embodiment the invention used to show the preferred angles for the front wall of the lift pad pedestal and the shallow angle of the lifting topography of the lift pad.
Figure 15:
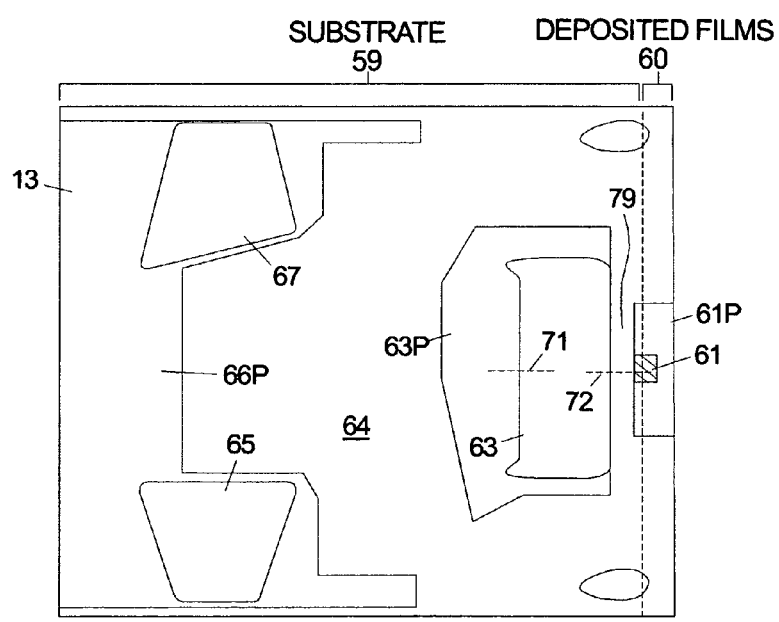
FIG. 15 is a plan view of the ABS of a slider according to the invention showing the front pads, the lift pad, the lift pad pedestal and the thermal protrusion pad.
Figure 16:
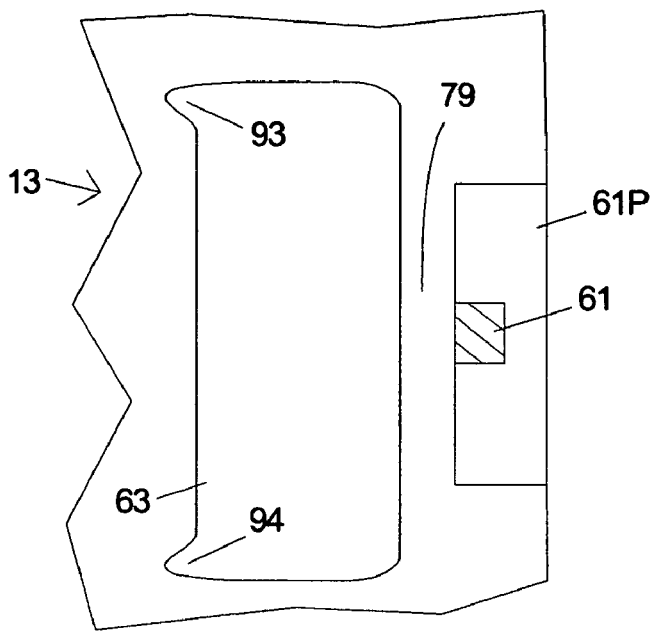
FIG. 16 is an enlarged plan view of the lift pad and the thermal protrusion pad according to the invention.

FIG. 15 illustrates a plan view the ABS of a slider 13 according to the invention having a thermal protrusion pad 61 and a lift pad 63. The area of the thermal protrusion pad is small relative to the lift pad. One advantage of the small area is that burnishing time in the embodiment which uses burnishing-on-demand is reduced. The deposited films 60 which include the heads are located at the trialing end of the slider. The air flow is from left to right in FIGS. 13-16 and 18. Preferably two phases of etching are used to form air-bearing features on the air-bearing surface (ABS). The area 64 is the area of the deepest etch. The second, shallower level of etching forms the surfaces of the front pad pedestal 66P, the lift pad pedestal 63P and the thermal protrusion pad pedestal 61P. The front pads, the lift pad and there pedestals are formed in the substrate material 59 of the wafer. The two of front pads 65, 67 are co-planar with the top of the lift pad 63 and are slightly raised above the plane of the pedestals 66P, 63P and 61P. The lift pad 63 is wider (perpendicular to the air flow) than it is long (parallel to the air flow) for reasons that will be explained below.

Figure 13:
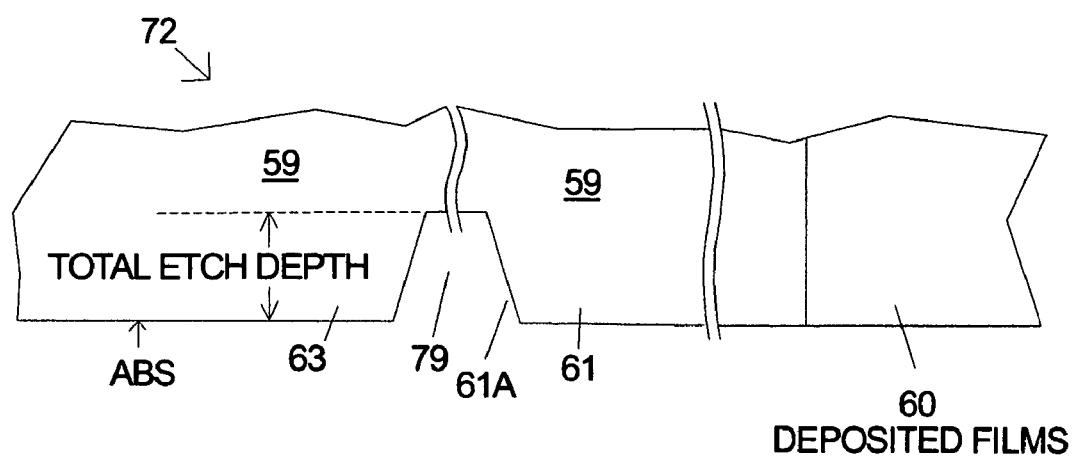
FIG. 13 is a midline section of a slider showing the lift pad and the thermal protrusion pad according to an embodiment the invention.

FIG. 13 is an enlarged view of a section of slider 13 along line 71 of FIG. 15. The section is taken along the midline of the slider parallel to the direction of airflow under the slider. The lift pad 63 and the lift pad pedestal 63P are formed in the substrate material 59 of the wafer. The thermal protrusion pad 61 and its pedestal 61P are formed across the boundary of substrate material 59 and the deposited films 60 and include both in the embodiment shown. The trench 79 separates the lift pad from the thermal protrusion pad. The trench is not necessarily straight and other embodiments can have differently shaped pads. The trench is formed by the deepest etch. The total etch depth is preferably from about 0.5 to 3.0 microns with 1.5 microns being most preferred. The shallow etch which is used to form the lift topography is preferably from 0.1 to 0.3 microns with 0.18 microns being most preferred. The width of the trench 79 (which determines the separation between the back of the lift pad and the thermal protrusion pad) is preferably significantly wider than it is deep with a preferred width of 10-100 microns with the embodiment shown having a trench width of 22 microns.

The lift pad pedestal 63P is larger in area than the lift pad 63 which is formed on top of it. The shape of the lift pad pedestal 63P and the lift pad 63 contribute to the flying characteristics. The top surface of the lift pad pedestal 63P outside of the lift pad 63 is determined by the shallow etch; therefore, it is approximately 0.4 to 2.9 microns above the lowest etched surface of the ABS. The region containing the thermal protrusion pad 61 is also typically formed using two etch levels and is constructed with a front wall 61A with a steep angle which will act to prevent additional lift when it is protruding under the influence of the heater. It is undesirable for lift to be generated when the thermal protrusion pad is protruding since the purpose is to bring it into contact with the disk. The steep wall 61A on the front of the thermal protrusion pad minimizes the lift that would otherwise be generated. This steep wall separates the thermal protrusion pad from the rest of the ABS. Minimizing lift from the thermal protrusion pad minimizes the compensation of fly-height change due to the protrusion and decreases the heater power necessary for burnishing. The design of the invention reduces the compensation effect from about 25% or more in conventional designs to only about 2%. Therefore, the lift-spoiling wall can decrease the needed heater power by more than about 25%. The overcoat material which is typically deposited over the ABS is not shown in this Figure and will be discussed in more detail below.

FIG. 14 is an enlarged view of the leading edge of the lift pad 63 shown in FIG. 13 which shows the angles in more detail. Standard prior art principles of ABS design can be used to select the angles and step heights. The front wall 63A of the lift pad pedestal 63P has negligible effect on the aerodynamics. The front wall 63B of the lift pad 63 is formed with a shallow angle and a step height which will generate lift when air flows over the ABS during operation. The front wall 63A of the lift pad pedestal 63P is preferably is formed at an angle $\phi$ of greater than about 10 degrees from the horizontal with 20 degrees being typical. The top edge 63B is preferably formed with a shallow angle $\Theta$ of 0.1 to 6 degrees from horizontal and a step height of from 0.05 to 0.5 microns to generate lift. The angles of the front pads 65, 67 and pedestal 66P are similar to that described for the lift pad 63 and the lift pad pedestal 63P.

Referring again to the plan view the ABS in FIG. 15, the shapes of the lift pad 63 and the lift pad pedestal 63P are determined by prior art principles and many specific embodiments are possible which vary, in part, based on the specific fabrication processes used to make the sliders. The following discussion gives guidelines and describes the specific embodiment shown in the figures, but other shapes can easily be chosen within the scope of the invention. The major objective of the air bearing slider design is to have a pad which encapsulates the head element but which does not produce lift from protrusion during writing or burnishing. Two methods are employed to reduce the lift produced by protrusion. First, the thermal protrusion pad is made as small as is practicable, for example, with dimensions from 5 to 50 microns. One embodiment has a thermal protrusion pad 28 by 30 microns. Second, the thermal protrusion pad is formed in such a way that compression over the pad is minimized. For air to enter and be compressed, there must be either an angle of attack, known as slider pitch, or a taper or shallow step, also referred to as a step taper. The pitch angle is inherent in this type of air bearing design and cannot be eliminated, but the small size of the pad reduces this portion of the lift to a negligible effect. A step taper is eliminated by defining the front wall 61A of the thermal protrusion pad 61 by the deep etch. The sidewall angle produced by this process is steep enough and the etch step is deep enough to eliminate any lift from this type of compression.

In the slider design, the lift pad 63 just upstream from the thermal protrusion pad 61 supplies the necessary lift for the trailing portion of the slider. This displaces the lift force forward from its prior art location and shortens the effective length of the slider. In other words, the trailing edge force moment arm, that is, the distance from the slider pivot to the center of the lift force on the lift pad, becomes shorter. In order to achieve an equivalent force moment that would be supplied by a lift pad located at the very trailing edge of the slider, the pad must increase in size. The consequence of the pad size increase is to increase the slider sensitivity to variations in crown, or slider curvature in the length direction, and to slider camber, or slider curvature in the transverse direction. The effect of the shortened moment arm and the trailing edge lift pad size increase is reduced by two other design changes. First, the deep etch trench 79 separating the lift pad 63 from the thermal protrusion pad 61 is made as narrow as possible and yet still retain the property of spoiling any compression lift on the element pad. This keeps the moment arm reduction to a minimum. Second, the shape of the trailing edge of the lift pad 63 is optimized to make it as compact as possible to minimize the fly height variations due to slider surface curvature. In optimizing the shape of the lift pad 63, the key consideration is the to have the maximum amount of lift as far towards the trailing edge of the pad as possible in order to maximize the slider stiffness in the length direction (that is, resistance to externally applied pitch moments), while balancing the contribution to fly height variations due to slider surface curvature variations. The fact that the lift pad 63 is wider than it is long in this embodiment reflects the stronger contribution of slider crown variations relative to those from camber variations. In a longer pad, the influence from crown would be greater in two ways: from the length of the pad subject to crown variations and from the proximity of the pad toward the center of the slider where the parabolic crown magnitude changes would be greater. The leading edge "ears" 93, 94 shown in FIG. 16 of the lift pad 63 serve to add some small additional lift while at the same time reducing the slider susceptibility to roll as a function of disk radius. The prior art computer programs which are used in the modeling of ABS features have an optimization facility which allows these kinds of analyses to be made in a straightforward manner.

Alternative embodiments of the invention will now be discussed. Each of the designs has pico slider dimensions and a measured fly height of about 8 nm. Embodiments 1 and 2 have a slider pitch of 160 micro-radians. In embodiment 1, unlike the conventional design, the trailing lift pad is divided into a leading lift pad and a smaller trailing thermal protrusion pad which is approximately 28 um×30 um. The deep etch forming the leading edge 61A of the thermal protrusion pad 61 has a steep enough wall angle so that very little ABS lift is generated by the thermal protrusion pad. The trailing edge of the lift pad 63 is approximately 30 um from the N58/alumina interface of the deposited thin films 60 forming the heads. Since very little protrusion occurs 30 um deep into the N58 from the heater, the lift pad 63 will not protrude significantly when the heater is on and the protrusion will only affect the thermal protrusion pad 61. Since little lift is generated by the thermal protrusion pad 61, each nanometer of protrusion will result in nearly a full nanometer of fly height loss. The thermal protrusion pad is made very narrow (about 30 um) to reduce the area that must be burnished and to reduce fly height variations due to variations in slider roll.

Figure 18:
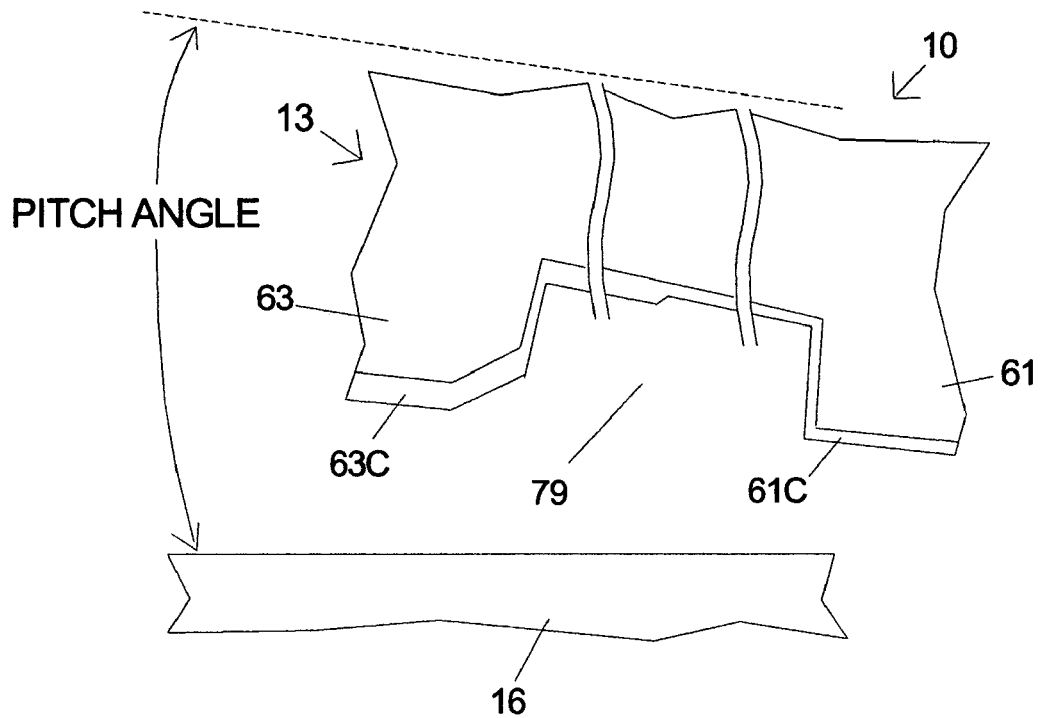
FIG. 18 is a section view of a slider with a lift pad and a thermal protrusion pad according to an embodiment of the invention using a thinner overcoat over the thermal protrusion pad.

FIG. 18 will be used to illustrate embodiment 2. The features are not to scale, since the overcoat thicknesses, which are measured in nanometers, would not be visible on a scale which shows the pads. The pitch angle has also been exaggerated for purposes of illustration. Embodiment 2 uses two overcoat thicknesses on the ABS surface to enhance the effectiveness of the lift pad. In this embodiment the thermal protrusion pad 61 has a thinner overcoat 61C than the lift pad 63. The use of a thicker overcoat 63C on the lift pad 63 compensates for the change in fly-height between these two pads due to the pitch angle of the slider and effectively lowers the fly-height of the lift pad without bringing the pad into contact with the disk prematurely. Lowering the fly-height of the lift pad stiffens the slider air-bearing and reduces fly-height variations and the effects of interactions between the thermal protrusion pad and the disk. Reducing fly-height variations in this way also reduces the TFC heater power necessary for burnishing in the burnish-on-demand concept by at least an additional 10%. The overcoat can be any suitable material. Carbon is commonly used. The dual thickness can be achieved using prior art techniques by either thinning the overcoat 61C while the remainder of the slider is masked or preferably by depositing additional overcoat material on ABS including the lift pad while the thermal protrusion pad is masked. The transition between the two different overcoat thicknesses is shown in the trench 79. In the example of embodiment 2, the thermal protrusion pad 61 has 6 nm less carbon than the lift pad and the rest of the ABS. Since the offset between the trailing edge of the lift pad 63 and trailing edge of the thermal protrusion pad 61 is about 50 um and the slider pitch is 160 micro-radians, the difference in height is about 8 nm. The additional 6 nm of carbon on the lift pad brings the lifting surface closer to the disk, thus increasing air-bearing stiffness while the thermal protrusion pad remains the lowest point on the ABS. The trailing edge of the lift pad 63 is beveled to ensure that roll variations do not cause a low point at a trailing corner of this pad.

The thermal protrusion pad designs according to the invention will have similar fly heights and depend little on disk radius. In the embodiment 1 design the lifting surface is significantly shifted forward as compared to the conventional design. Due to the pitch of the slider, this lifting surface is also further from the disk, creating a softer air-bearing. This softness causes a 17% degradation in fly-height variation compared to the conventional design. Embodiment 2 reduces the fly-height variation by 15% as compared to embodiment 1 while maintaining the high pitch angle of 160 micro-radians by using the thicker carbon overcoat on the lift pad. Again, this overcoat brings the lift pad closer to the disk and stiffens the ABS. By reducing the fly-height sigma by 15% the dual overcoat thickness concept reduces the power required by the TFC heater to burnish away these variations.

Figure 17:
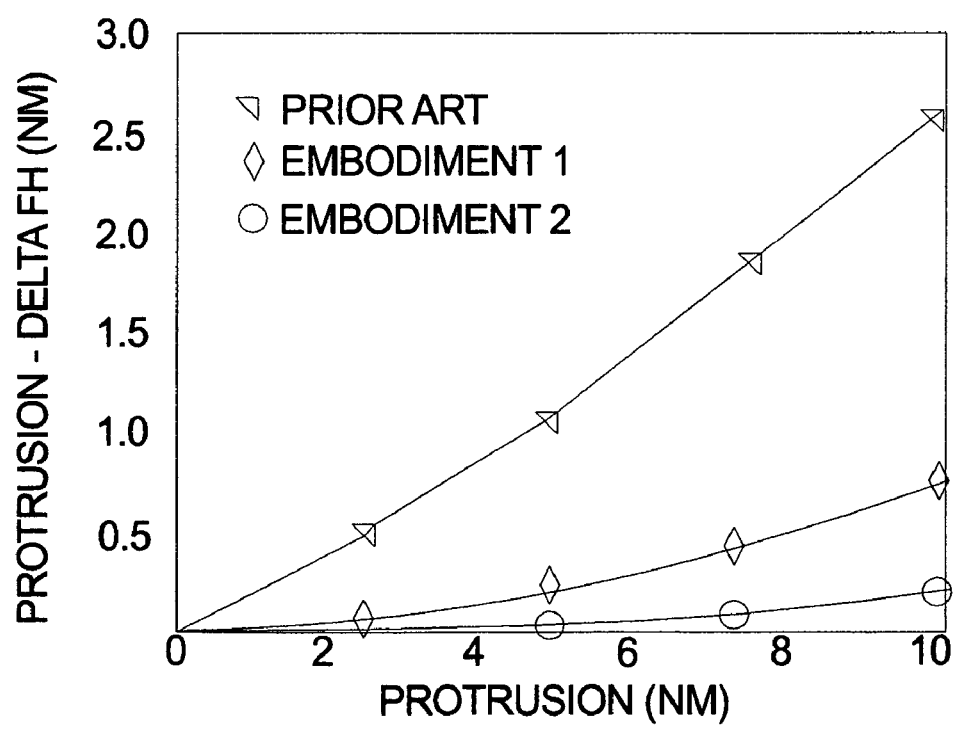
FIG. 17 is a graph comparing effect on fly-height of protrusion of the heads between a prior art slider and sliders according to the invention.

The protrusion is modeled with an elliptical-shape of dimensions 50 nm×80 nm centered on the write gap of the head and the change in fly-height at this point is determined as a function of protrusion height. FIG. 18 plots the protrusion height (x-axis) and the protrusion minus the change in the fly-height (y-axis) for a prior art head and the two embodiments of the invention. The graph in FIG. 17 shows the effectiveness of the deep etch between the lift pad and thermal protrusion pad for reducing fly-height compensation due to protrusion. While the conventional prior art design shows 27% fly-height compensation, embodiment 2 shows only about 2% compensation. By reducing the fly-height compensation, the steep wall angle at the leading edge of the thermal protrusion pad increases the effective stroke of the heater at a given power and reduces the power required by the heater to burnish away the thermal protrusion pad overcoat from a distribution of sliders.

The invention has been described with respect to particular embodiments, but other uses and applications for the techniques according to the invention will be apparent to those skilled in the art.

The invention claimed is:

1. A disk drive comprising:
    a slider with at least one heater in an electrical circuit, the heater being disposed to heat a thermal protrusion pad, with dimensions from 5 to 50 microns, containing a read sensor located on a trailing edge of the air-bearing surface of the slider, the slider having a lift pad located in front of the thermal protrusion pad, the lift pad and the thermal protrusion pad being separated by a trench and the lift pad having a shape that creates lift, and the thermal protrusion pad creating a negligible amount of lift, whereby lift is not significantly increased when the heater heats the thermal protrusion pad causing the thermal protrusion pad to protrude; and
    a control system which selectively varies power to the heater to induce a variable protrusion of the thermal protrusion pad to adjust a fly height of the slider during read operations.

2. The disk drive of claim 1 wherein the lift pad has a front wall disposed at a shallow angle of approximately from 0.1 to 6 degrees from a plane of the air-bearing surface.

3. The disk drive of claim 1 wherein the lift pad has a step height of approximately 0.05 to 0.5 microns.

4. The disk drive of claim 1 wherein the lift pad is wider in a direction perpendicular to a direction of airflow than a direction parallel to the direction of airflow.

5. The disk drive of claim 4 wherein the lift pad in a plan view has symmetrical lift-generating features on a left and right side of the lift pad, the lift-generating features protruding outward toward the front of the slider.

6. The disk drive of claim 1 further comprising a lift pad pedestal on which the lift pad is formed, a top surface of the lift pad pedestal being recessed from a top surface of the lift pad, the top surface of the lift pad pedestal extending from the lift pad toward the front of the slider.

7. The disk drive of claim 6 wherein a front wall of the lift pad pedestal is disposed at an angle greater than approximately 10 degrees from horizontal.

8. A disk drive comprising:
    a slider with at least one heater in an electrical circuit, the heater being disposed to heat a thermal protrusion pad containing a read sensor located on a trailing edge of the air-bearing surface of the slider, the slider having a lift pad located in front of the thermal protrusion pad and having a shape that creates lift, and the thermal protrusion pad creating a negligible amount of lift, whereby lift is not significantly increased when the heater heats the thermal protrusion pad causing the thermal protrusion pad to protrude; and
    a control system which selectively controls power to the heater to induce a variable protrusion of the slider; and
    wherein the control system includes a burnishing procedure which applies power to the heater to protrude the thermal protrusion pad to force the thermal protrusion pad into contact with the disk surface while rotating the disk to burnish the thermal protrusion pad by removing at least a portion of material from the thermal protrusion pad.

9. The disk drive of claim 8 wherein the burnishing procedure removes an overcoat from the read sensor.

10. A disk drive comprising:
    a slider with at least one heater in an electrical circuit, the heater being disposed to heat a thermal protrusion pad containing a read sensor located on a trailing edge of the air-bearing surface of the slider, the slider having a lift pad located in front of the thermal protrusion pad and having a shape that creates lift, and the thermal protrusion pad creating a negligible amount of lift, whereby lift is not significantly increased when the heater heats the thermal protrusion pad causing the thermal protrusion pad to protrude; and
    a control system which selectively controls power to the heater to induce a variable protrusion of the slider; and
    wherein the lift pad and the thermal protrusion pad are separated by a trench etched into a substrate and a wall of the thermal protrusion pad forming one side of the trench is disposed at a steep angle and a top surface of the thermal protrusion pad is flat so that lift is not created when the thermal protrusion pad protrudes when heated.

11. The disk drive of claim 10 wherein the trench has a depth greater than 0.5 microns.

12. The disk drive of claim 10 wherein the trench has a width from 10 to 100 microns.

13. A disk drive comprising:
    a slider with at least one heater in an electrical circuit, the heater being disposed to heat a thermal protrusion pad containing a read sensor located on a trailing edge of the air-bearing surface of the slider, the slider having a lift pad located in front of the thermal protrusion pad and having a shape that creates lift, and the thermal protrusion pad creating a negligible amount of lift, whereby lift is not significantly increased when the heater heats the thermal protrusion pad causing the thermal protrusion pad to protrude; and
    a control system which selectively controls power to the heater to induce a variable protrusion of the slider; and
    wherein the lift pad has an overcoat layer with a first thickness and the thermal protrusion pad has an overcoat layer with a second thickness which is less than the first thickness.

* * * * *